United States Patent [19]

Rawski

[11] Patent Number: 4,958,904
[45] Date of Patent: Sep. 25, 1990

[54] OPTICAL SLIP RING

[75] Inventor: John M. Rawski, Maple Grove, Minn.

[73] Assignee: Honeywell, Inc., Minneapolis, Minn.

[21] Appl. No.: 112,317

[22] Filed: Oct. 23, 1987

[51] Int. Cl.$^5$ .............................................. G02B 6/36
[52] U.S. Cl. .............................. 350/96.20; 250/227.11; 340/870.29; 350/96.15
[58] Field of Search ............. 350/96.13, 96.15, 96.16, 350/96.18, 96.20, 96.21, 96.22; 250/227, 231 SE, 236; 340/870.28, 870.29

[56] References Cited

U.S. PATENT DOCUMENTS

| | | | |
|---|---|---|---|
| 3,622,793 | 11/1971 | Dalton et al. | 250/227 X |
| 4,055,058 | 10/1977 | Tewsley et al. | 66/219 |
| 4,109,998 | 8/1978 | Iverson | 350/574 |
| 4,165,913 | 8/1979 | Fitch | 350/96.15 |
| 4,190,318 | 2/1980 | Upton, Jr. | 350/96.20 |
| 4,278,323 | 7/1981 | Waldman | 350/96.20 |
| 4,310,767 | 1/1982 | Peacock | 250/551 |
| 4,333,015 | 6/1982 | Faulhaber | 250/551 |
| 4,460,242 | 7/1984 | Birch et al. | 350/96.20 |
| 4,466,695 | 8/1984 | Kruger | 350/96.20 |
| 4,525,025 | 6/1985 | Hohmann et al. | 350/96.15 |
| 4,555,631 | 11/1985 | Martens | 250/551 |
| 4,767,175 | 8/1988 | Böhner et al. | 350/96.20 |

Primary Examiner—John D. Lee
Attorney, Agent, or Firm—Charles J. Ungemach

[57] ABSTRACT

An optical slip ring assembly involving a small diameter transmitter accurately spaced with respect to a plurality of detectors arranged in a predetermined pattern operates to transmit a signal across an air gap between two relatively rotating members.

17 Claims, 1 Drawing Sheet

OPTICAL SLIP RING

BACKGROUND OF THE INVENTION

1. Field of the Invention

The present invention relates to apparatus for transmitting signals between relatively rotatable members and, more specifically, to a slip ring type assembly for transmitting high frequency light signals representing digital information between such members without physical contact.

2. Description of the Prior Art

It is often desirable to transmit information to and from a rotatable member as, for example, a rate table upon which various pieces of equipment such as gyroscopes and the like are being tested, and a non-rotating member such as the surrounding environment where Power Sources and Information Handling Equipment are located. In the past, it has been most common to use mechanical type slip rings which include a slider moving over a surface so that electrical signals may pass therebetween. Such devices suffer a number of disadvantages including jittering of the wiper, which produces noise, and the creation of dust particles by the frictional engagement of the two members, which requires periodic cleaning. The prior art is also able to handle signals only at very low speeds. To overcome these problems, it has been proposed to use optical transfer of information by utilizing an optical light source on one of the two members and an optical detector on the other of the two members. For example, in the Robert W. Upton, Jr. U.S. Pat. No. 4,190,318 issued Feb. 26, 1980, and assigned to the assignee of the present invention, an optical slip ring is disclosed in which radial light signals formed in a continuous ring are transmitted between a barrel and a surrounding sleeve within which the barrel is rotatably mounted. The ring of light signals is produced and detected respectively by a plurality of light emitting diodes and light detector means carried on the barrel and the sleeve. The light detector means may include an optical fiber bundle for transmitting light signals to a remote detector. A difficulty encountered with apparatus of this type is that the light emitter and light detectors are spaced at various distances from each other during the process of rotation. Because of this, the transmission time from the transmitter to the detector is greater when the distances are large than when the distances are small. As a result, the output of the detector has a limited bandwidth and high frequency signals cannot be transmitted across the gap. The ability to handle high frequency signals is important to increase the speed of transmission for digital type information.

Some prior art devices have transmitted information optically in the axial direction and using a larger number of detectors as in the Tewsley U.S. Pat. No. 4,055,058 or a large number of fiber optic members in a bundle as in the Iverson U.S. Pat. No. 4,109,998. With axial transmissions, a higher frequency is available but a difficulty is encountered in that the number of independent separate transmissions is quite limited. For example in the Tewsley patent only two concentric rows of transmitters are shown and in the Iverson, only three concentric fiber optic bundles are available. It is desirable to be able to transmit information between the rotating and non-rotating members along an axis which is perpendicular to the axis of rotation as was done in the above-mentioned Upton patent because a large number of individual channels can then be stacked one on top of another along the axial direction.

Another problem encountered in the prior art is the difficulty in handling high frequency signals because of the angle of spread from the transmitter to the detectors. When the spread of the beam is large, as in the Upton patent mentioned above, the paths of some beams is greater in length than others. This produces a "mushy" signal where the crisp edges of a square wave, for example, become rounded and the space between two consecutive pulses fills in. Without increasing the space between pulses (which decreases the frequency) the separate pulses become less distinct and may even be obliterated. As a result, frequencies in excess of about 8 megahertz cannot be handled.

BRIEF DESCRIPTION OF THE INVENTION

The present invention overcomes the above-mentioned problems in the prior art by providing a stackable slip ring assembly using a single optical transmitting fiber of dimensions which hold its output optical beam in a relatively small angle and using a plurality of detectors all connected in parallel and arranged in brick-like fashion so as to permit assembly of the device without difficulty in aligning the transmitter. Furthermore, the present invention can be used to handle signals up to 1000 megahertz in frequency.

DETAILED DESCRIPTION OF THE PREFERRED EMBODIMENTS

Figure 1:
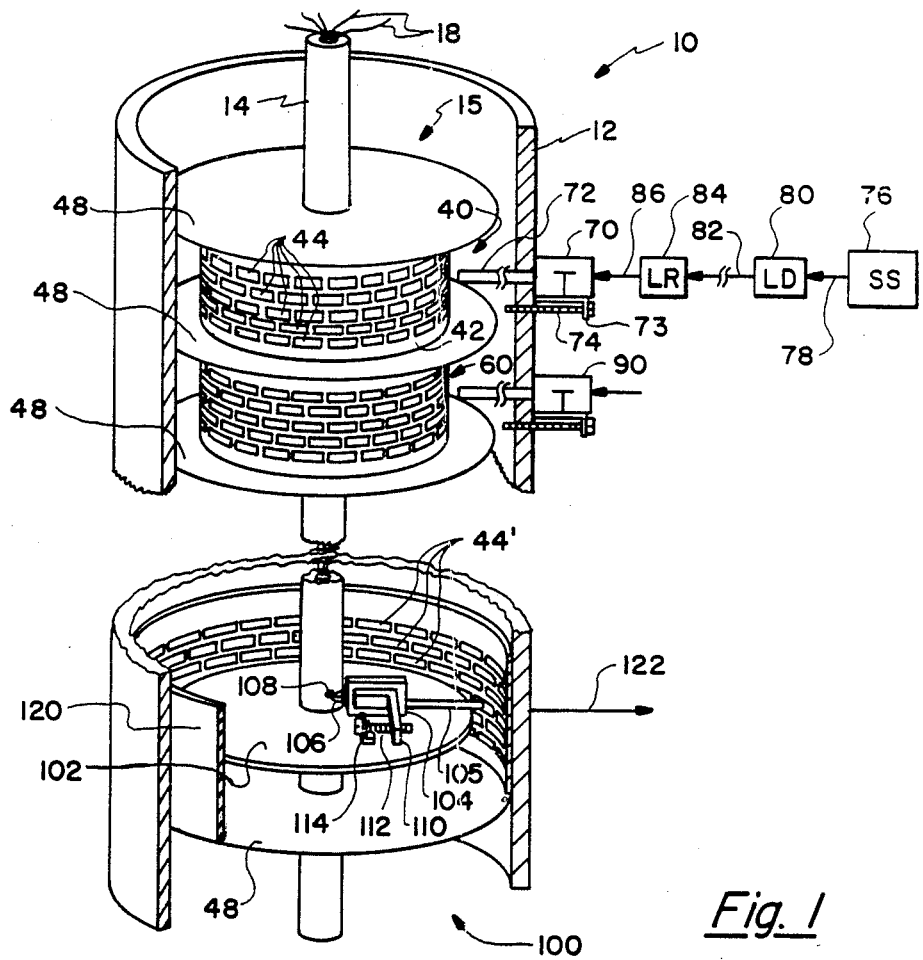
FIG. 1 is a partially cross-sectional view of a number of optical slip rings according to the present invention stacked on a rotatable shaft.

In FIG. 1, the optical slip ring apparatus 10 is shown comprising a housing 12 which is shown partly in section so as to reveal a central hollow axle member 14 upon which are mounted a plurality of light detector assemblies shown generally at 15. Hollow axle member 14 may be connected to, for example, a rate table upon which test apparatus, such as angular rate sensors, are mounted. In order to operate and analyze the operation of such sensors, it is necessary to transfer electrical data input and output signals to remote stationary equipment. To this end, a plurality of conductors such as shown by reference numeral 18 are connected to the equipment being tested and extend down through the central portion of hollow axle 14 to the optical slip rings in the assemblies 15. Since there may be a number of pieces of equipment simultaneously being analyzed, it is desirable to be able to have a fairly large number of optical slip rings to bring signals into and out from each piece of equipment. In certain rate table work, there may be a requirement for as many as 90 to 120 different inputs, some of which may be power inputs that must be handled with normal mechanical slip rings, but the remaining majority of which are analyzation inputs and outputs that can be handled with digital signals transmittable by light beam. In order to handle large numbers of such inputs and outputs, it has been found necessary to mount the individual slip rings along the axis of rotation rather than circumferentially around the axis because the only limit for the number of such slip rings is the length of the axle. While mechanical slip rings have been used in the prior art, they create dust which requires frequent cleaning and, the wipers often jitter on the surface conductors to produce undesirable noise. Accordingly, optical transducers have become a very desirable way of transferring digital information to and from rate tables and other rotating members. It is also desirable to be able to transfer information at high rates of speed and, accordingly, high frequency capabilities for the optics are necessary. One limiting factor on the frequency capability of an optical signal relates to the size or diameter of the fiber optic elements transmitting the radiation across the gap between the members and the length of the gap as can be seen with reference to FIG. 3.

Figure 2:
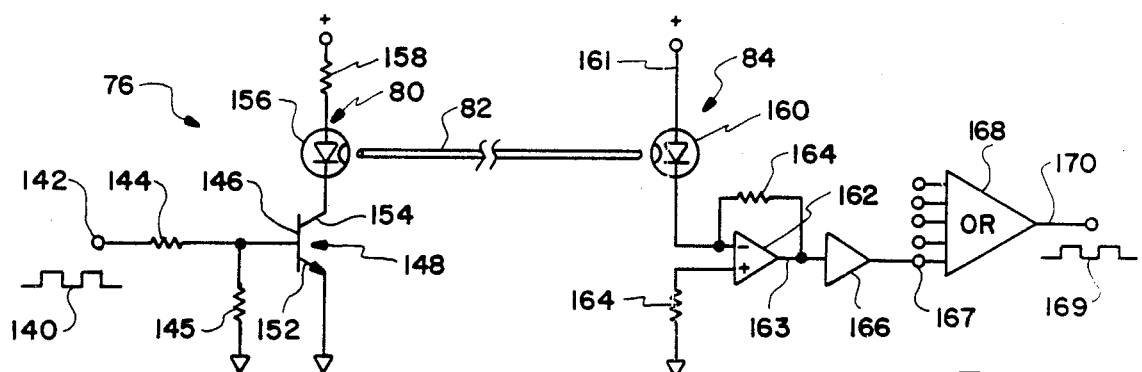
FIG. 2 is a schematic diagram of the electronic circuitry usable with the present invention.
Figure 3:
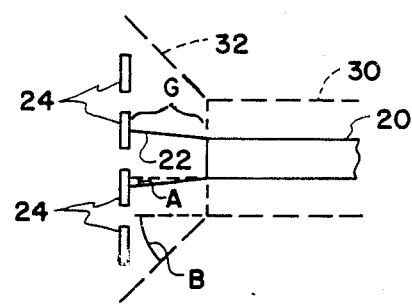
FIG. 3 shows the output angle of the fiber optic element of the present invention as compared with the prior art.

In FIG. 3, a solid line fiber optic element 20 of relatively small diameter is shown sending a beam 22 to a set of receiving detectors 24 across a gap "G". The source of the light may be a laser or preferably a light emitting diode which has excellent high frequency characteristics and long life and the receiving elements 24 may be photodiodes which generate a current upon the receipt of energy from the transmitter. As will be described in connection with FIG. 2, the current signal is converted to an output voltage which, in the preferred embodiment, will be high frequency digital pulses. It can be seen in FIG. 3 that the small diameter fiber optic element 20 produces a relatively small angular beam 22. For example, when the fiber is no more than 150 microns in diameter, the deviation angle A is no more than 7½ degrees so that the overall spread is no more than 15 degrees This is a result of the small diameter of element 20 because a larger element would have more internal reflections and thus create a larger exit angle. If the fiber was as shown in dashed lines 30, the beam would emerge along dashed lines 32 which are seen to be at an angle B which is about 45°. The transit time between for the 45° ray will be longer than for a ray that goes straight across and, accordingly, the pulse width will be automatically expanded because the detectors will produce an output pulse starting when the first light is received over the shortest path until the last light is received over the longest path. The longest path is, of course, equal to the shortest path divided by the cosine of the angle B and accordingly at about 60°, a 50% duty cycle input signal will be totally obliterated. As the pulse width expands, it fills in the spaces between pulses and eventually eliminates the signal data entirely and, accordingly, it is desirable to keep the diameter of the transmitting cable as small as practical.

It should also be noted that the air gap "G" between the fiber optic element 20 and detectors 24 should be kept small since as the air gap increases, a larger number of receivers accept the signal and this too permits uncertainty in the arrival time of the signal and reduces the frequency band width capabilities. Accordingly, it is desirable to space the transmitter and the detectors closely together to increase the frequency response of the system. Of course, the use of a single row of detectors would eliminate some of this uncertainty but then the difficulty in accurately positioning the fiber optic transmitter vertically creates a problem since the beam may strike less than the whole detector thus decreasing its amplitude or, in the extreme may miss the detector entirely. Accordingly, it is desirable to have several rows of detectors capable of receiving the same signal from the fiber optic transmitter.

Returning to FIG. 1, a first detector assembly 40 is shown mounted on axle 14 and comprises a drum 42 which may be made of ceramic material and upon which a large plurality of detector elements 44 are formed, preferably by solid state deposition techniques which can form large numbers of detectors in desirable patterns relatively inexpensively. In actual practice, the voltage converters, amplifiers, and buffer circuitry associated with the detectors, can also be deposited on the same drum.

It should be noted that the individual detectors are stacked around the drum 42 in brick-like fashion with each row offset from the rows on either side thereof. The purpose of this is to increase the amount of signal received by the detectors in the event that the transmitted beam falls at an intersection between two individual detectors and two individual rows. To this end, the spacing between detectors should be kept as small as practical and in no event should it exceed one half of the diameter of the radiation beam it receives.

The detectors 44 on the drum 42 are connected in parallel and connections thereto are fed through apertures in axle 14 to emerge among the group of conductors 18 leading to the electronic components on the rotating member. Light shielding discs 48 are mounted on both ends of the drum 42 to prevent light from other detector assemblies or any other stray light from affecting the individual detectors thereon. FIG. 1 shows a second detector assembly 60 mounted on axle 14 just below detector assembly 40 and detector assembly 60 being substantially identical to detector assembly 40 will not be further described except to note that while two such assemblies are shown, a large number thereof may be placed along axle 14, each being separated from the other by light shields 48 so as to prevent cross-talk.

The transmitter assemblies comprise a transmitter 70 connected to a fiber optic fiber 72 through the wall of housing 12. Transmitter 70 is mounted to housing 12 by an "L" shaped bracket 73 and a bolt 74 which passes through the "L" shaped member 73 and the housing 12 in a threaded fashion. Rotation of bolt 74 operates to move transmitter 70 to the right and left in FIG. 1 so as to bring the end of fiber optic element 72 to the desired proximity with respect to the detectors 44 on drum 42. Transmitter 70 is connected to a signal source 76 by means of an connection 78, a fiber optic line driver 80 having an output on a fiber optic element 82 and a fiber optic line receiver 84 which has an output 86 to drive the transmitter 70. As mentioned, transmitter 70 may be a solid state laser or an LED depending upon the band width, life, and cost considerations and the optical signals it delivers will be coded into high frequency pulses. A similar transmitter 90, shown operable with respect to the lower assembly 60 is connected to a signal source in the same manner as transmitter 70 and will not be further described.

The activation of transmitter 70 from the signal source 76 will produce a high frequency light beam in fiber optic element 72 which will cross the gap between the fiber optic element 72 and the detector assembly 44 so as to strike one or more of the detectors thereon. The signals from the detectors are then summed and sent by conductors such as 18 up to the electrical apparatus on the rate table.

In order to return signals from the electrical apparatus on the rate table to stationary apparatus located remotely therefrom, it is necessary that the light transmission operate in the reverse direction from that heretofore described. To this end, FIG. 1 shows an assembly 100 comprising a disc 102 connected to the axle 14 and rotatable therewith. Mounted on disc 102 is a transmitter 104 having an output fiber 105. Transmitter 104 and fiber 105 may be the same as transmitter 70 and fiber 72 described above. Transmitter 104 is connected to its signal source by a plurality of wires 106 which pass through an aperture 108 in axle 14 and pass through the hollow portion thereof to emerge as one or more of the conductors 18 described above.

Transmitter 104 is connected to disc 102 by an "L" shaped bracket 110 and a bolt 112 passing therethrough and through a second "L" shaped bracket 114 connected to disc 102. Rotation of bolt 112 will move transmitter 104 and fiber 105 to the right and left in FIG. 1 in a manner similar to that described in connection with transmitter 70. The interior of housing 12 has connected thereto a cylindrical member 120 which has deposited thereon a plurality of detector elements 44' which, like the detectors 44 described above, may be deposited in brick-like fashion on the inner surface of cylinder 120. Although not shown, the upper edge of detectors 44 will be covered by light impervious disc 48 to prevent light from passing to the detectors 44 from other sources.

In the apparatus for transmitting signals from the electronics on the rotating table to the exterior, the transmitter 104 will send a light signal through the fiber optic element 105 to produce a beam which transfers across the gap between element 105 and the detectors 44' so that one or more of the detectors receives the beam. The output of the detectors 44' are then summed to produce an output shown by an arrow 122.

FIG. 2 shows electronic circuitry of FIG. 1 in greater detail. The circuit includes the signal source 76, the line driver 80, the optic cable 82 and the line receiver 84. This apparatus may be used to produce the signal to transmitter 70 or to produce the output 122 of FIG. 1. More particularly, the desired signal represented by square wave 140 is presented at a terminal 142 and through a voltage divider formed by resistors 144 and 145 to bias the base 146 of an NPN transistor 148. The emitter 152 of transistor 148 is shown connected to signal ground and the collector 154 is shown connected to a light emitting diode 156 which receives a positive input through a resistor 158. It is seen that the signal 140 will operate to turn transistor 148 on and off in the desired pattern so that LED 156 will be turned on and off so as to emit light in accordance with the desired digital code contained in signal 140. This signal will be received by the fiber optic element 82 and transmitted therethrough to the receiver 84 which, as mentioned above, may be a photodiode 160. The input of photo diode 160 is connected to a positive source by a conductor 161 and the output of photodiode 160 is presented to the negative terminal of an amplifier 162 whose positive input is connected through a resistor 164 to signal ground. An output from amplifier 162 appears on a conductor 163 and is fed back by a resistor 164 to the negative input terminal of amplifier 162. The amplified output on conductor 163 is presented to a buffer amplifier 166 whose output is connected to one terminal 167 of an OR gate 168 that produces the final output signal 169 on a conductor 170. Other input terminals of OR gate 168 are shown and are connected to similar diodes 160 comprising the other detectors 44 or 44' described in connection with FIG. 1. Accordingly, OR gate 168 sums the signals from all of the detectors 44 or 44' that are receiving any light signal so as to produce the summed output signal 169 on conductor 170.

It is seen that I have provided a unique optical slip ring having a number of advantages over other available techniques. Since the fiber optic elements do not involve any mechanical touching of parts, there will be a significantly lower signal to noise ratio than is available in the mechanical assembly and virtually no required cleaning of equipment. Also, because a small fiber optic element is used and is positionable very closely with respect to the detectors the beam width can be kept small to permit higher frequency signals to be employed. Also, since the detectors are mounted in several rows, great accuracy in alignment is not required and because of the brick-like arrangement of detectors, enough power for the transmitted signal is assured. In one construction of the invention I have been able to demonstrate 5 megahertz capability. Furthermore, since there are no frictional forces involved, the degradation of the equipment over time is eliminated and the system involves virtually no maintenance. While I have described the invention in detail with respect to the preferred embodiments, many changes will occur to those skilled in the art. For example, the types of detectors and transmitters used, the specific mounting arrangements and the electronic circuitry hereindescribed are matters of design choice. I therefore do not intend to be limited to the specific disclosures used in connection with the description of the preferred embodiments and intend only to be limited by the following claims.

I claim:

1. An optical slip ring comprising: first and second relatively rotatable members; a source of first frequency, binary coded pulses;
    a single optical fiber having a first end connected to the source to receive the pulses and having a second end operable to transmit a beam of radiation which fluctuates at the first frequency in accordance with the binary code;
    a plurality of radiation detectors connected in parallel and spaced on the first member in a pattern of alternate rows of detectors with each row being offset from adjacent rows so that at least one of the detectors will receive the beam when the members are rotating, regardless of their relative position; and
    adjustable means mounting the fiber on the second member to adjust the distance between the second end of the fiber and the detectors to restrict the spread of the beam.

2. Apparatus according to claim 1 wherein the adjustable means includes an "L" shaped member having a first leg connected to the fiber and a second leg; and screw means connecting the second leg to the second member so that rotation of the screw means moves the second end of the fiber with respect to the detectors.

3. Apparatus according to claim 1 wherein the source is a solid state laser.

4. Apparatus according to claim 1 wherein the source is a light emitting diode and the detectors are light responsive diodes.

5. Apparatus according to claim 4 including switch means and wherein the light responsive diodes each produce an output connected to the switch means to produce a pulse wherever the diode receives light.

6. Apparatus according to claim 5 further including "OR" means having a plurality of inputs and an output and means connecting the switch means to the "OR" means.

7. Apparatus according to claim 1 wherein the first frequency is any value up to 1000 megahertz, the diameter of the optical fiber is no greater than 150 microns, and the spread of the beam from optical fiber to detector is no greater than 15°.

8. An optical slip ring comprising:
first and second relatively rotatable members;
optical receiving means on the first member, said receiving means including a plurality of radiation detectors arranged in at least two parallel rows and spaced so that a beam of radiation will be received by at least one detector;
optical transmitting means mounted on the second member to project a beam of radiation having a predetermined spread to the receiving means, said transmitting means including a single optical fiber extending from the second member toward the first member and spaced from the receiving means by a first distance; and
source means connected to the transmitting means to supply a binary signal thereto to drive the transmitting means at a first frequency.

9. Apparatus according to claim 8 wherein the optical fiber is no greater than 150 microns in diameter.

10. Apparatus according to claim 8 wherein the first frequency is any value up to 1000 megahertz.

11. Apparatus according to claim 8 wherein the distance between detectors is no greater than one half the diameter of the beam.

12. Apparatus according to claim 8 wherein the spread of the beam from the transmitting means is no more than 15°.

13. Apparatus according to claim 8 wherein the parallel rows of detectors are arranged in brick-like off set fashion to increase reception of the beam at the intersections of the detectors.

14. Apparatus according to claim 13 wherein the detectors are solid state diodes deposited on the surface of the first member.

15. Apparatus according to claim 14 further including amplifying means connected to the detectors, the amplifying means being deposited on the surface of the first member.

16. An optical slip ring comprising:
first and second relatively rotatable members, the first member having a surface;
a source of first frequency binary coded pulses;
a single optical fiber having a first end connected to the source to receive the pulses and having a second end operable to transmit a beam of radiation substantially perpendicular to the surface, which beam fluctuates at a first frequency in accordance with a binary code; and
a plurality of radiation detectors mounted on the surface and connected in parallel, the radiation detectors being spaced along the surface in a pattern so that at least one of the detectors will receive the beam when the members are rotating regardless of their relative position.

17. An optical slip ring comprising:
first and second members relatively rotatable about an axis;
a source of first frequency, binary coded pulses;
a single optical fiber having a first end connected to the source to receive the pulses and having a second end operable to transmit a beam of radiation substantially radially with respect to the axis, which beam fluctuates at the first frequency in accordance with the binary code; and
a plurality of radiation detectors connected in at least two parallel rows and spaced on the first member in a pattern so that at least one of the detectors will receive the beam when the members are rotating regardless of their relative position.

* * * * *